United States Patent [19]

Kim

[11] Patent Number: 4,524,987

[45] Date of Patent: Jun. 25, 1985

[54] TRICYCLES

[75] Inventor: Sang K. Kim, Seoul, Rep. of Korea

[73] Assignee: Myung Keun Oh, Kyung Gi-Do of Korea

[21] Appl. No.: 470,626

[22] Filed: Feb. 28, 1983

[30] Foreign Application Priority Data

Feb. 27, 1982 [KR] Rep. of Korea ............... 1506/82[U]

[51] Int. Cl.³ .................. B60D 1/00; B62M 1/14; B62K 5/06
[52] U.S. Cl. .................... 280/204; 280/247; 280/265; 280/282
[58] Field of Search .......... 280/282, 247, 248, 265, 280/292, 15, 204

[56] References Cited

U.S. PATENT DOCUMENTS

| | | | |
|---|---|---|---|
| 367,025 | 7/1887 | Crowley | 280/265 X |
| 693,379 | 2/1902 | Davis | 280/292 |
| 946,280 | 1/1910 | Slotkin | 280/282 X |
| 1,332,819 | 3/1920 | Eklund | 280/282 X |
| 1,410,449 | 3/1922 | Brown | 280/282 |
| 2,107,722 | 2/1938 | Vimeux | 280/248 |

FOREIGN PATENT DOCUMENTS

| | | | |
|---|---|---|---|
| 531128 | 1/1922 | France | 280/248 |
| Ad.54592 | 5/1950 | | 280/248 |
| 101071 | 3/1941 | Sweden | 280/292 |

Primary Examiner—John A. Pekar
Attorney, Agent, or Firm—Armstrong, Nikaido, Marmelstein & Kubovcik

[57] ABSTRACT

This invention provides a tricycle having a simple frame that is shaped to provide an efficient low profile, lever actuation, which is adapted to be hand-operated for enjoyable, interesting and efficient training purposes, including efficient propulsion, and interesting and enjoyable arm-hand training and coordination. The frame also has low profile steering from a sitting or leg-outstretched position, which is comfortable, provides a low center of gravity and enhances the efficiency, enjoyment, training and coordination provided by the hand-operation. Still further, the frame is shaped to provide a strong, simple and effective coupling system for connecting more than one tricycle in a train for purposes of education, enjoyment, efficiency, training and coordination.

14 Claims, 3 Drawing Figures

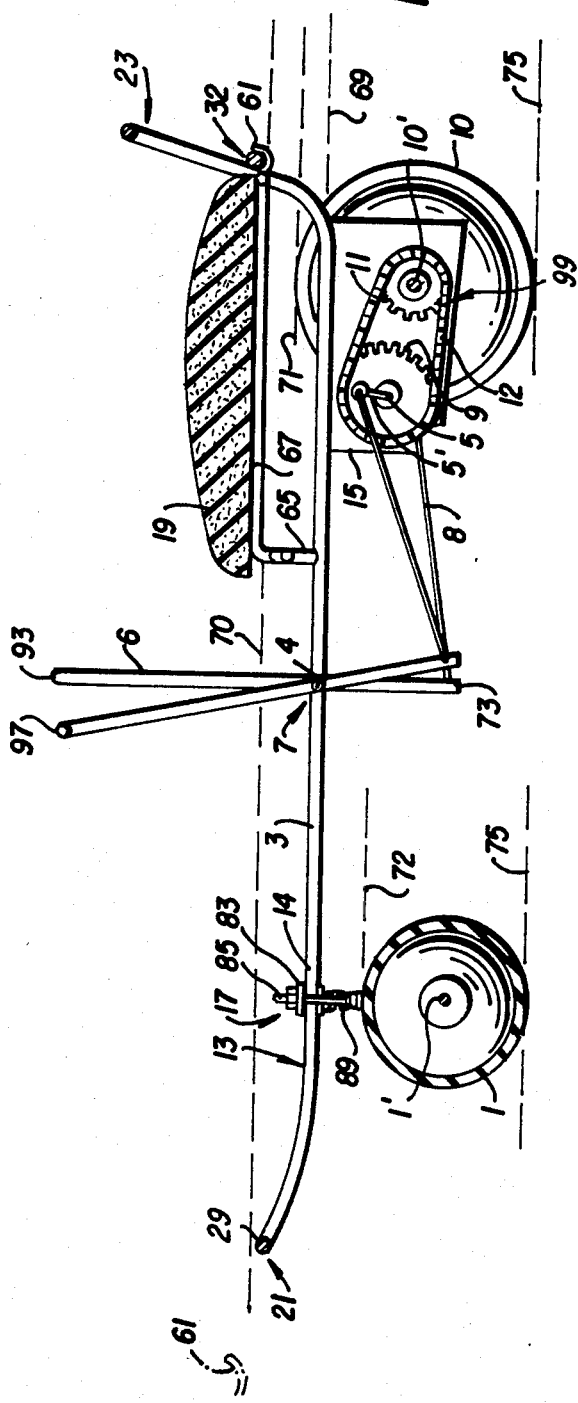
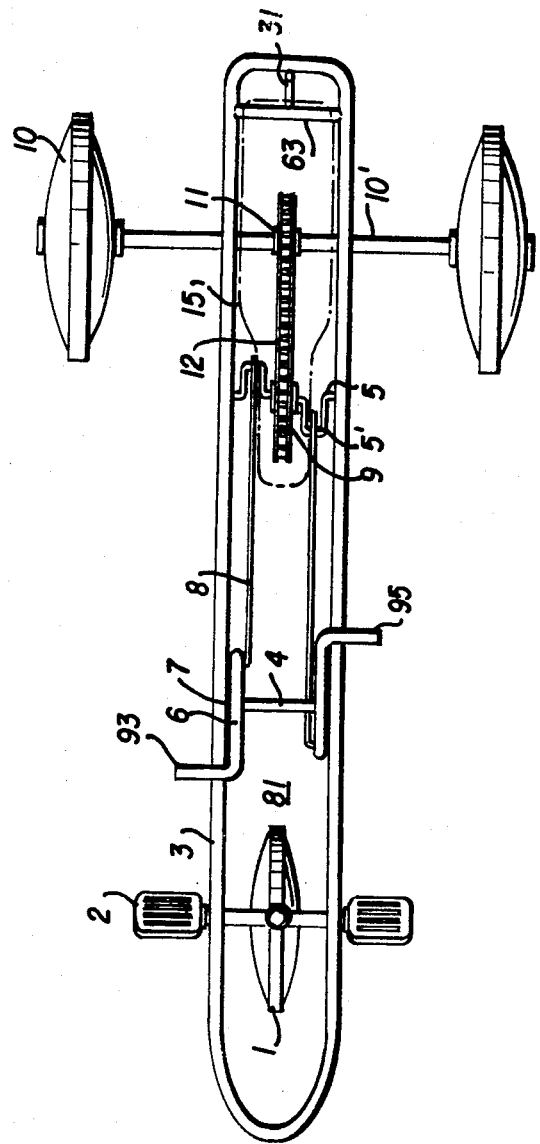
FIG. 1
FIG. 2

TRICYCLES

BACKGROUND OF THE INVENTION

In the field of tricycles, it is advantageous to provide a three-wheeled vehicle. Ordinarily, the front wheel is steered by hand-operation, while the front wheels are also pedaled. These prior tricycles have been very slow because the front wheel, which is larger than the back wheels, rotates one time as the pedal turns one time. Thus, the operator of the tricycle, particularly children, get tired of playing with it easily. It is also advantageous to provide a simple tricycle frame that is shaped to provide an efficient low profile and a low center of gravity. It is still further desired to provide a tricycle train.

SUMMARY OF THE INVENTION

This invention provides a tricycle having a simple frame that is shaped to provide an efficient, low profile, lever actuation, which is adapted to be hand-operated for enjoyable, interesting and efficient training purposes, including efficient propulsion, and interesting and enjoyable arm-hand training and coordination. The frame also has a low profile steering from a sitting or leg outstretched position, which is comfortable, provides a low center of gravity and enhances the efficiency, enjoyment, training and coordination provided by the hand-operation. Still further, the frame is shaped to provide a strong, simple and effective coupling system for connecting more than one tricycle in a train for purposes of education, enjoyment, efficiency, training and coordination.

In accordance with one embodiment, this invention provides a tricycle comprising a support body forming a frame having levers mounted thereon for opposite reciprocation, lever-actuated rear wheels in operable association with the levers and having rear wheel supports mounted on the frame, and a front wheel having a front wheel support mounted on the frame, the frame being shaped to provide a low profile, low center of gravity seat mounted on the frame for hand-actuated lever operation of the back wheels by an operator who is also is in a low profile, low center of gravity sitting position on the seat for foot-steering of the front wheel, the said frame also having front and rear ends forming upwardly directed portions that are adapted to provide fast operating couplings for selectively and removably connecting the said tricycle to another said tricycle in a train. With the proper selection of elements and their location, as described in more detail hereinafter, the desired tricycle is achieved.

It is thus an object of this invention, therefore, to provide an improved tricycle.

It is another object of this invention to provide a tricycle having a simple frame that is shaped to provide an efficient low profile, lever actuation. It is another object to provide front wheel foot-steering.

It is another object of this invention to provide a tricycle which is adapted to be hand-operated for enjoyable, interesting and efficient training purposes, including efficient propulsion and interesting and enjoyable arm-hand training and coordination.

It is another object of this invention to provide a frame having a low profile steering means which is operated from a sitting or a leg outstretched position, which is comfortable, provides a low center of gravity and enhances the efficiency, enjoyment, training and coordination provided by the hand-operated propulsion.

A still further object is to provide a frame shape to provide a strong, simple and effective coupling system for connecting more than one tricycle in a train for purposes of education, enjoyment, efficiency, training and coordination.

A still further object is to provide improved front wheel steering having a shock absorber.

It is a still further object to provide a tricycle seat a back rest.

It is a still further object of this invention to provide a tricycle having hand-operated levers for driving a power train that is located under the tricycle seat.

The above and further objects and novel features of this invention will be understood in more detail from the following detailed description when read in connection with the accompanying drawings. It is to be expressly understood, however, that the drawings are for purposes of illustration only.

In one train mode, the front wheel of the back coupled tricycle is raised slightly off the ground.

BRIEF DESCRIPTION OF THE DRAWINGS

In the drawings, where like elements are referenced alike,

FIG. 1 is a partial side view of the tricycle of this invention.

FIG. 2 is a partial top view of the tricycle of FIG. 1.

Figure 3:
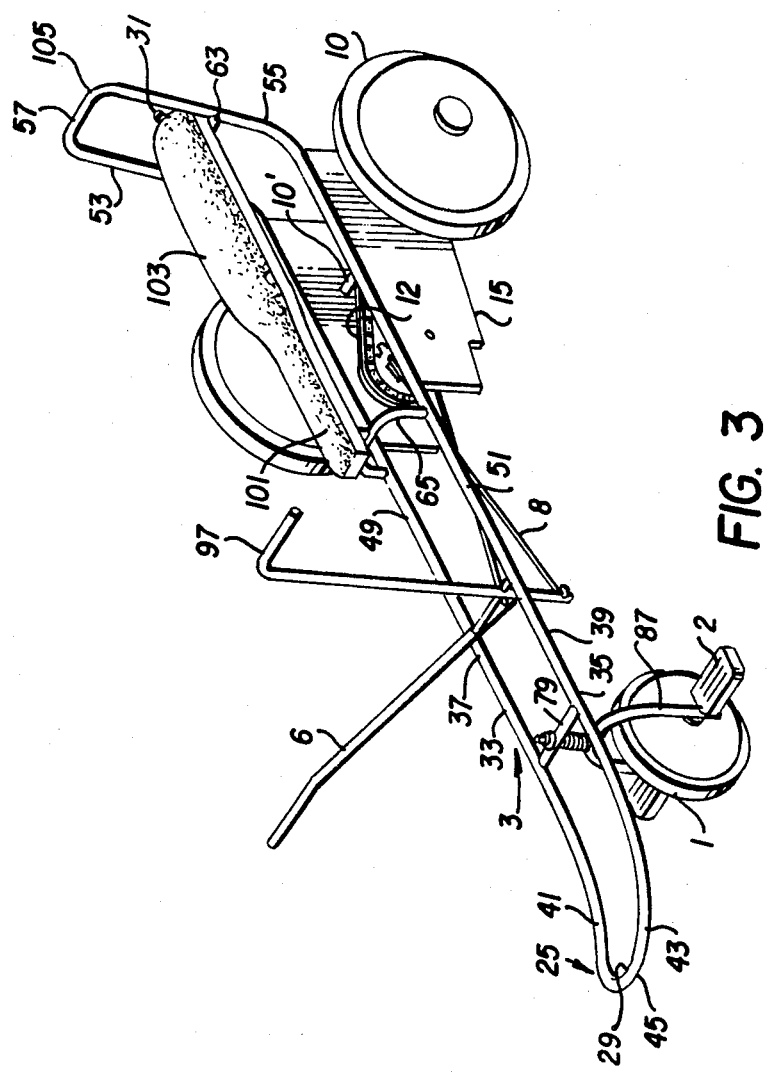
FIG. 3 is a partial isometric view of the tricycle of FIG. 2. cDETAILED DESCRIPTION OF THE PREFERRED EMBODIMENT Accordingly, this invention is useful for the training, enjoyment, and education of children. However, as will be understood in more detail hereinafter, the training and other functions of the described invention are more widely applicable to a wide range of individuals, both young and old, of both sexes. Accordingly, it will be understood that the described and claimed tricycle is particularly adapted for the realization of an efficient lever-type tricycle, which is moved by hands acting on the levers provided, which are reciprocated back and forth to give rotation to the back wheels of the tricycle. Moreover, the training motion of the levers will provide an improved speed over the tricycles known heretofore, along with a low center of gravity, a low profile, and the ability to form trains. Now referring to FIGS. 1 through 3, the front wheel 1 is shown with a front wheel axle 1'. Steps 2, which may advantageously comprise an extension of the front axle shaft or rubbery elastic pads having treads mounted on the ends of the front wheel axle may be used for better traction. These steps are used for steering the front wheel to cause the tricycle body 3 to move in the desired direction.

The power train for actuating the tricycle to propel it forward and/or backwards, provides a support shaft 4 which is mounted in the body 3 for moving the crankshaft 5, which has two oppositely-directed cranks 5'. To this end, levers 6 are mounted on the support shaft 4 so that the bottom part 6' of the levers extends below the main part of the body 3 in which the support shaft 4 is located. Advantageously, the levers 6 are located on spaced-apart portions 7 of the support shaft 4 for the rapid reciprocation of the levers 6 back and forth in directions opposite to each other, and for the easy hand-operation thereof.

In order to connect the motion of the lever 6 and to transform the back-and-forth reciprocal motion into rotating motion, either forward or backwards in the rear wheels, a connecting rod 8 is provided for each of the levers 6 at the bottom part 6' of the levers. It is the job of these connecting rods to transform the back-and-forth motion into reciprocating motion of the back wheels. Thus, a chain gear 9 is mounted on the crankshaft 5 for driving the rear wheels 10 via the rear axle shaft 10'. To this end, a driven gear 11 is mounted on the rear axle 10' for the rear wheels 10 and a chain 12 is rotated on the chain gear 9 and the driven gear 11 in response to the rotating motion of the crankshaft 5, which is caused by the back-and-forth movement of the levers 6 and their connecting rods 8. Advantageously, therefore, the spacing in between the two cranks 5' corresponds roughly to the spacing between the levers 6, which is provided by the support part 7 of the support shaft 4. Thus, the steps 2 have the function of changing the direction of the body 3 by an operator who is moving the lever arm 6 back and forth to cause the rear wheels to rotate in a desired direction.

Advantageously, the support shaft 4 and the crankshaft 5 are mounted on the part of the body 3 that is in between the front and rear wheels, respectively. Also, the two levers 6, which are fixed axially on the support shaft 4, have bottom parts 6', which are projected into the space below the support part 7 of the shaft 4, and thus, the whole chain, including the connecting rods and the cranks 5', as well as the chain 12 and gears 9 and 11, are located underneath the frame body 3 in a convenient location that also has the advantage of providing a low center of gravity and a low profile. Thus, when the cranks 5' turn by receiving a turning force from the connecting rods 8, the chain gear 9, which is mounted axially at one side of the crankshaft 5, which is preferably in the middle thereof in between the two cranks 5', a place where the driven gear 11 is mounted also, the chain gear is connected to the driven gear 11 with the chain 12 in a convenient and effective manner. As a result, the tricycle runs faster than the tricycles known heretofore. Also, because the tricycle is operated with a hand-operated lever, this tricycle helps children that become adolescent, and others, to train their arms.

Advantageously, the tricycle 13, comprises a support body 3 forming a frame 14 having levers 6 mounted thereon for the opposite reciprocation thereof. The levers 6 actuate the rear wheels 10 in operable association with the placement of the levers and the lever supports, as well as the rear wheel supports, which are rear wheel supports 15, which are mounted on the frame 14. Also, the front wheel 1 has a front wheel support 17 mounted on the frame 14. In order to shape the frame to provide a low profile, a low center of gravity, and low center of gravity seat 19, which is mounted on the frame 14 for hand-actuated lever operation of the back wheels 10, by an operator who is in a low profile, low center of gravity sitting position on the seat 19, for foot-steering of the front wheel 1, via steps 2, the frame has a simple construction which will be understood from the following. Also, the frame has front and rear ends 21 and 23 forming upwardly directed portions 25 and 27 that are adpated to provide fast-operating couplings 29 and 31 for selectively and removably connecting the tricycle 13 to another like tricycle 13 in a train 32, which is schematically illustrated in FIG. 1, as will be understood in more detail hereinafter.

The frame 14, which is shown in FIG. 1 and FIG. 3, has a simple construction, comprising parallel bars 33 and 35 having first horizontal portions 37 and 39 in front of the support shaft 4 for the levers 6. These bars also have two first upwardly directed front portions 41 and 43 extending to a connection 45 therebetween for forming a front coupling 29. Likewise, the frame 14 includes parallel bars having second horizontal portions 49 and 51 behind the support shaft 4 for the levers 6. Also, there are provided two upwardly directed rear portions 53 and 55 extending to a connection 57 therebetween, and a rear coupling 31 is provided on the upwardly directed portions of the rear of the frame body 3. This coupling 31 can thus be used for a connection to the front portion 25, including the connection 45 between the upwardly directed front portions 41 and 43 for forming a train in an easy and simple manner, which provides for the easy, selective, and removable assembly of two or more tricycles in a train. Thus, in one embodiment, the rear coupling 31 includes a rear hook 61 for connecting two tricycles together in a train so that the front coupling of one of the tricycles mates with the rear hook 61 of another of the tricycles in the train. To this end, the rear hook 61 is advantageously mounted on a rear cross-piece 63 that is mounted between the upwardly directed rear portions 41 and 43 for supporting the rear end of the seat 19 on the frame 14.

In the embodiments shown in FIGS. 1-3, the seat 19 has a front cross-piece 65 that is mounted between the parallel bars 33 and 35 and the bottom 67 of the seat 19 for supporting the front end of the seat on the frame 14 so that the bottom of the seat is mounted in a plane 69 that is generally parallel to the bars 33 and 35 at a distance therefrom. As will be understood in more detail hereinafter, this configuration provides a low center of gravity and a low profile.

In this connection also, the rear wheels 10 touch a plane 71 that is above the parallel bars 33 and 35 and below the bottom 67 of the seat 19, and the front wheel is smaller than the rear wheels. Also, the top of the front wheel touches a plane 72 that is below the plane 69 that is generally parallel to the bars 33 and 35. Still further, the levers 6 extend below the frame 14 to a point 73 above the plane 75 touching the bottom of the wheels 1 and 10, the levers 6 extending also above the frame 14 to a point 77 above the bottom 67 of the seat. Thus, the levers 6 have their connecting rods 8 for connecting the bottom of the lever to the lever-actuated back wheels in such a way that the power train means for transmitting the reciprocating motion to the rear wheels, is above the bottom part 6' of the levers 6 during at least part of their reciprocation so as to give the power easily to the rear wheels while maintaining the desired low center of gravity and low profile.

Referring more particularly to the drive power train, this power train has a compact arrangement below the seat 19, which includes the crankshaft 5 having the two oppositely-located cranks 5' thereon for oppositely reciprocating the levers, which leads to a provision for braking the vehicle. This has a safety feature for causing the vehicle to come to a stop when desired, by restraining the movement of the levers 6. By the same token, the levers are used when desired to rotate the crankshaft and the drive means including the chain 12 for transmitting the rotation of the crankshaft to the rear wheels at a location beneath the seat 19.

The steering by the operator who sits in a position with his legs extended and his feet on the steps 2, comprises a front wheel support 17. This support 17 has a cross-piece 79 spanning the space 81 between the parallel bars 33 and 35. It also has a shaft support 83 mounted on the cross-piece and a shaft 85 that is mounted on the shaft support. Still further, this front wheel support 17 has a U-shaped fork member 87 that is attached to the shaft 85 for supporting the front wheel axle 1' for the front wheel 1 from the frame 14 so that the front wheel axle 1' has the steps 2 on the opposite ends of the axle 1' for steering the front wheel. Still further, the front wheel support 17 has a spring 89 between the front wheel cross-piece 79 and the U-shaped fork member 87 for cushioning the transmission of shock from the front wheel to the frame 14. To this end, for example, the front wheel support 17 may comprise a bolt having a head that fits through a hole in the fork 87, or is securely attached thereto, such as by welding, brazing and the like, and the top of the shaft 85 may also be fixed to the top of the cross-piece 79. For example, the shaft 85 may be bolted to the top of the piece 79 and/or to the bottom and top of the shaft by means 83 which may be used to hold the cross-piece 79 therebetween. Moreover, the front wheel support may have a fork member that is made from tubular steel for strength, rigidity, lightness of weight, ease of fabrication, and to provide an inexpensive combination.

Likewise, the frame 14 may be formed from tubular steel for like reasons. In one embodiment, which is shown in FIG. 1, the tubular steel for the frame 14 has a round, cross-section, which is shown at the front and rear portions of the frame 14. Also, this round, cross-section of the tubular steel portion of the frame 14 is shown in cross-section at the rear to provide a portion of the steel frame coupled to the hook 61 to form a train thereto. Similarly, another hook 61 is shown at the front end of the tricycle for coupling purposes.

Still further, in one embodiment, the two levers 6 may be formed from hollow, steel tubes 93 and 95 for like purposes. Thus, for example, they are easily and strongly mounted for efficient operation on the support portion 7 on the support shaft 4 that spans the space 81 between the parallel bars 33 and 35 so as to have handles 97 that are at a level above the level of the seat 19 for suitable hand-operation by an operator seated on the seat 19 so as to use the power train 99.

Still further, in referring to FIG. 3, it will be seen that the seat 19 advantageously has a special cross-section in one preferred embodiment. To this end, the seat 19 has in cross-section, a narrow portion 101 for the operator's legs. This narrow portion 101 extends from an enlarged portion 103 adjacent a portion of the upwardly directed rear portion 27 of the frame 14, so as to form a back rest 105. This has the advantage of comfort, efficiency, and a low profile and low center of gravity, as well a position for strongly reciprocating the levers 6 in the power train 99.

In operation, an operator sits on the seat 19 with his legs extended to rest on the oppositely-located steps 2. By moving his or her feet back-and-forth, the vehicle body 3 is directed in a location as desired. Moreover, by the hand operation of the levers 6 to reciprocate the levers back-and-forth, this reciprocating motion is transferred to the power train means 99 so that the vehicle is propelled in a desired direction, either forward or backward. Likewise, the constraint of the movement of the levers 6 has a tendency to brake the vehicle as desired, in a safe manner. Still further, the levers 6 have a large mechanical advantage, for providing the desired propulsion with a strong force, a low center of gravity, and a low profile.

This invention has the advantage of providing an improved tricycle having a simple, inexpensive and strong frame that is shaped to provide an efficient profile, lever actuated, tricycle, which is hand-operated for enjoyable, interesting and efficient training purposes, including efficient propulsion, an interesting and enjoyable arm-hand training and coordination. Moreover, the described invention has the advantage of front wheel steering, which is leg-operated. Still further, this invention has the advantage of providing simple and effective coupling means connecting more tricycles in a train for purposes of education, enjoyment, efficiency training and coordination.

This invention also has the advantage that in the train mode, the front wheel of the back coupled tricycle is raised slightly off the ground, as illustrated by the plane of the seat support in FIG. 1, which shows that the plane of the seat support passes along the bottom of the back coupling or hook, so that the front coupling or connection of the back coupled tricycle, where the frame is curved upwardly, is raised slightly above the plane of the bottom of the rear wheels to provide a force for holding the back coupled tricycle coupled to its front coupled tricycle due to the weight of lifting the front of the back coupled tricycle slightly off the ground. This advantage will also be understood, since in the normal operation of the front tricycle, which has all three wheels on the ground, the plane of the seat support is above the top of the front coupling or connections, where the plane is curved upwardly, as shown schematically by the first dashed line above the plane of the rear wheels in FIG. 1.

What is claimed is:

1. A tricycle (13), comprising a support body (3), forming a frame (14) having levers (6) mounted thereof for opposite reciprocation, lever actuated rear wheels (10) in operable association with the levers (6) and having rear wheel supports (15) mounted on the frame (14), and a front wheel (1) having a front wheel support (17) mounted on the frame (14);

the frame (14) being shaped to provide a low profile, low center-of-gravity seat (19) mounted on the frame (14) for hand actuated lever operation of the back wheels (10) by an operator who also is in a low profile, low center-of-gravity sitting position on the seat (19) for foot steering of the front wheel (1);

said frame (14) also having front and rear ends (21 and 23) forming upwardly directed portions (25 and 27) having fast operation couplings (29 and 31) for selectively and removably connecting the said tricycle to another said tricycle in a train (32)

said frame including parallel bars (33 and 35) having first horizontal portions (37 and 39) in front of the levers and said first horizontal portions having two first upwardly directed front portions (41 and 43) extending to a connection (45) therebetween positioned forwardly of said front wheel forming one of said fast operating couplings (29).

2. The tricycle of claim 1 in which the frame (14) includes parallel bars (33 and 35) having second horizontal portions (49 and 51) behind the levers and that have two upwardly directed rear portions (53 and 55) extending to a connection (57) therebetween, and another of said fast operating couplings being a rear coupling (39) on the upwardly directed portions.

3. The tricycle (13) of claim 2 in which the rear coupling includes a rear hook (61) for connecting two of said tricycles (13) together in a train so that the front coupling of one of said tricycles mates with the rear hook (61) of another of said tricycles in said train (32).

4. The tricycle of claim 3 in which the rear hook (61) is mounted on a rear cross-piece (63) that is mounted between the upwardly directed rear portions (53 and 55) for supporting the rear end of the seat (19) on the frame.

5. The tricycle of claim 4 in which the seat (19) has a front cross-piece (65) that is mounted between the parallel bars (33 and 35) and the bottom (67) of the seat (19) for supporting the front end of the seat on the frame so that the bottom of the seat is mounted in a plane (70) that is generally parallel to the bars (33 and 35) at a distance thereabove.

6. The tricycle of claim 5 in which the rear wheels (10) touch a plane (71) that is above the plane (69) generally parallel to the bars (33 and 35) and below the plane (70) of the bottom of the seat (19), and the front wheel is smaller than the rear wheels and touches a plane (72) that is below the plane (69) generally parallel to the bars (33 and 35).

7. The tricycle (13) of claim 6 in which the levers (6) extend below the frame (14) to a point (73) above a plane (75) touching the bottom of the wheels (1 and 10), the levers (6) extending above the frame (14), to a point (77) above the bottom (67) of the seat, and the levers (6) have connecting rod means (8) for connecting the bottom of the levers to the lever actuated rear wheels, the latter including a crankshaft (5) having two oppositely located and oppositely directed cranks (5') for oppositely reciprocating the levers to rotate the crankshaft, and means including a chain (12) for transmitting the rotation of the crankshaft to the rear wheels at a location beneath the seat(19).

8. The tricycle of claim 7 in which the front wheel support (17) comprises a front wheel cross-piece (79) spanning the space (81) between the parallel bars (33 and 35), shaft support (83), which is mounted on the cross-piece, a shaft (85) that is mounted on the shaft support, and a U-shaped fork member (87) that is attached to the shaft for supporting a front wheel axle (1') for the front wheel (1) from the frame (14), said front wheel axle (1') having steps (2) for steering the front wheel.

9. The tricycle of claim 8 inwhich the front wheel support (17) has a spring (89) between the front wheel cross-piece and the U-shaped fork for cushioning the transmission of shock from the front wheel to the frame.

10. The tricycle of claim 9 in which the front wheel support has a fork member that is made from tubular steel.

11. The tricycle of claim 10 in which the frame (14) is formed from tubular steel having a round cross-section (91).

12. The tricycle of claim 11 in which the two levers are formed from hollow steel tubes (93 and 95) that are mounted on support portions (7) on a support shaft (4) that spans the space (81) between the parallel bars (33 and 35) so as to have handles (97) that are at a level above the level of the seat (19) for hand operation by an operator seated on the seat (19).

13. The tricycle of claim 12 having power train means (99) for transmitting the reciprocating motion of the levers (6) to the rotation of the rear wheels (10), comprising connecting rods (8) for each lever (6), a chain gear (9) on the crankshaft (5) between the oppositely directed cranks (5') thereon, a driven gear (11) on the axle (10') of the rear wheels (10) so that the chain (12) runs on the chain gear (9) and the driven gear (11), the power train means (99) for transmitting the reciprocating motion being above the bottom part (6') of the levers (6) during at least part of this reciprocation so as to give power easily to the rear wheels while maintaining a low center-of-gravity and a low profile.

14. The tricycle of claim 13 in which the seat (19) in cross-section has a narrow portion (101) for the operator's legs extending from an enlarged portion (103) adjacent a portion of the upwardly directed rear portions (27) of the frame (14) that forms a back rest (105).

* * * * *